United States Patent Office
3,029,227
Patented Apr. 10, 1962

3,029,227
CROSS-LINKING AND CROSS-LINKING AGENTS
Lester E. Robb, Westfield, N.J., assignor, by mesne assignments, to Minnesota Mining and Manufacturing Company, St. Paul, Minn., a corporation of Delaware
No Drawing. Filed Aug. 20, 1956, Ser. No. 605,188
14 Claims. (Cl. 260—77.5)

This invention relates to a method of cross-linking with a new cross-linking agent and the cross-linked product produced thereby. In one aspect this invention relates to new vulcanizing admixture. In another aspect this invention relates to the cross-linking of linear polymers and to the resulting vulcanized polymer. Another aspect of this invention relates to the modification of the characteristics of chain saturated polymers containing halogen substituents on the carbon atoms. In another aspect this invention relates to a novel compound employed as a cross-linking agent. In still another aspect this invention relates to novel cross-linking agents and their preparation.

Chain polymers are thermoplastic in nature and exhibit continuous flow under the influence of heat and pressure. These polymers can be resoftened as often as desired and are usually soluble in selected solvents. However, cross-linked or vulcanized polymers are generally thermosetting, which is to say that they are insoluble in most solvents and that they cannot be softened without decomposition once they have hardened. A chain or linear polymer may, however, contain a small number of cross-linkages without losing its thermoplastic properties. It is often desirable to convert thermoplastic polymers into cross-linked polymers or to partially cross-link polymers in order to decrease their solubility and thermoplastic flow and, and in the case of thermoplastic elastomers, to obtain a harder, tougher product. The cross-linking of elastomers is commonly referred to as vulcanization.

Among the most difficultly vulcanizable thermoplastic resins are those prepared by the polymerization of halogenated monoolefins and of acrylate, such as, for example perhalogenated ethylenes. Among the resins prepared by the polymerization of halogenated monoolefins are the homopolymers of chlorotrifluoroethylene, vinylidene fluoride, and tetrafluoroethylene and copolymers of 2-chloroperfluoropropylene, chlorotrifluoroethylene, bromotrifluoroethylene, trifluoroethylene, chlorofluoroethylene, vinylidene fluoride, tetrafluoroethylene and hexafluoropropene.

Many of these thermoplastic polymers have unique and valuable properties. In some cases where it is desired to retain these properties and at the same time decrease the thermoplastic flow and solubility, the polymers are cross-linked. In the past it has been difficult to perform cross-linking of polymers of this type satisfactorily.

It has been suggested that polyfunctional organic compounds containing at least two primary or secondary amino groups can be used as cross-linking agents for polymers of this and other types. These polyamines have been found to possess a high order of activity as cross-linking agents and in fact have very desirable vulcanizing properties. However, it has also been found that these polyamines by their very activity, operate at a disadvantage insofar as practical vulcanizing processes are concerned. The primary disadvantage in the vulcanization of a rubbery material is observed when blending the vulcanizing agent, for example the polyamine, into the polymeric material by mechanical shearing forces. The blending takes place over an extended period of time and the shearing forces generate heat. The high temperature thus generated causes the initiation of the cross-linking reaction prior to the thorough blending of the vulcanizing agent into the polymeric material. The cross-linking reaction is self accelerated since it is exothermic and therefore brings about an increase in temperature. Thus the polymeric material is subject to scorching during the milling process owing to the ununiformly blended vulcanizing agent. The "pot life" of these polymers is very low since even at room temperature the ununiformly impregnated polymer will scorch in only a few hours.

Vulcanization with localized high concentration of the vulcanizing agent produces a brittle nonuniform product. It has been suggested that salts of polyfunctional amines be used as cross-linking agents for linear polymers. By employing the salt derivatives of polyfunctional amines the difficulties due to the high reactivity of the amines and the lack of uniform distribution in the vulcanizate are overcome. However, some of the salts were found to be insufficiently reactive with the polymeric material and although the vulcanizing agent could be mixed uniformly in the polymer, the product of the vulcanization was not sufficiently cross-linked. It is therefore desirable to find a vulcanizing agent which retains the cross-linking ability of the polyamines and which eliminates the disadvantages of scorching due to high reactivity, in other words to find a vulcanizing agent of controlled reactivity.

It is therefore an object of this invention to provide a new and improved cross-linked polymeric composition.

Another object of this invention is to provide a method for preparing a new and useful vulcanizing admixture having improved properties.

Another object of this invention is to provide uniformly cross-linked polymeric compositions.

Another object is to provide a new cross-linking agent having a controlled reactivity with respect to linear vulcanizable polymers.

Another object is to provide a cross-linked halogenated polymer having an extended "pot life."

Another object is to provide a cross-linked highly halogenated polymer which shows no signs of "scorch."

It is a further object of this invention to convert thermoplastic and thermosetting linear elastomers to uniformly vulcanized thermosetting polymers of reduced solubility and thermoplastic flow.

It is a further object of this invention to convert elastomers of chlorotrifluoroethylene to an insoluble and infusible polymer of uniform characteristics.

It is a further object of this invention to provide a method for preparing a novel cross-linking agent.

A still further object of this invention is to provide a method for preparing a cross-linked polymer which results in increasing the tensile strength upon aging of the vulcanized polymer.

Another object is to provide a process for the preparation of a novel vulcanizing admixture, which process is readily controlled to yield a cross-linked polymer having the desired characteristics.

Another object is to provide a method for the preparation of a novel cross-linked polymeric composition of improved properties, which process is characterized by the minimum formation of undesirable by-products.

Other objects and advantages of the present invention will become apparent to those skilled in the art from the accompanying description and disclosure.

According to this invention a vulcanizable polymeric material is reacted with a carbamic radical containing salt of an acyclic polyfunctional amine to produce a cross-linked polymer. The carbamic radical containing salt of the polyfunctional acyclic amine which serves as a cross-linking or vulcanizing agent is uniformly admixed with a linear vulcanizable polymer and is permitted to cross-link.

Cross-linking agents which are used in accordance with the process of this invention are acyclic polyfunctional amine salts which contain a terminal carbamic radical and correspond to the formula $N_2C_nH_2X_{2n}O_2$ wherein X is selected from the group consisting of hydrogen, chlorine and fluorine atoms and alkyl, aryl and amino radicals; at least one hydrogen atom is bonded to each of the nitrogen atoms and $n$ is an integer from 5 to 20. The preferred cross-linking agents have the following formula:

$$YHN-R-X \quad (1)$$

wherein R is an acyclic alkylene radical containing from 6 to 15 carbon atoms; Y is a hydrogen atom, a hydrogen molecule, an alkyl radical or an aryl radical; and X is a carbamic radical such as the carbamic radical per se (—NHCOO—) and a carbamic radical wherein one of the oxygen atoms is bonded to a hydrogen atom as in a N-carboxamino radical (—NHCOOH). The alkylene radical of the above formula can be a hydrocarbon or a substituted hydrocarbon radical and is preferably an unsubstituted hydrocarbon radical. When the alkylene radical is substituted it contains at least one substituent other than hydrogen which is selected from the group consisting of amino, alkyl and aryl radicals and fluorine and chlorine atoms and any combination of the foregoing substituents. When Y is an alkyl or aryl radical the radicals may be substituted with chlorine and/or fluorine atoms; however, when Y is an alkyl or aryl radical the radicals are preferably non-substituted hydrocarbon radicals. Y is most preferably a hydrogen molecule.

Cross-linking agents having an acyclic unsusbtituted alkylene radical containing from 6 to 10 carbon atoms and having a terminal ammonia group ($H_3N$—) and a terminal carbamic radical (—NHCOO—) as in the hexamethyleneaminocarbamic acid inner salt, $$+H_3N-(CH_2)_6NHCOO-,$$

and the decamethyleneaminocarbamic acid inner salt, $$+H_3N(CH_2)_{10}NHCOO-,$$

are most preferred. Some refer to compounds having this general type of structure, i.e. plus and minus charges, as carbonates or Zwitter ions, however the term "carbonate" is a misnomer.

The carbamic acid inner salt of a polyamine is prepared by reacting the corresponding polyamine with carbon dioxide under anhydrous conditions. The polyamine is preferably dissolved in a solvent before reacting it with carbon dioxide. Suitable solvents for the polyamine are organic solvents such as para-xylene, benzene, methanol and ethanol. The reaction temperature varies between about 20° C. and about 100° C. depending upon the solvent used. The volume of solvent to weight of polyamine varies between about 8:1 and about 50:1, preferably between about 10:1 and about 20:1. An excess of carbon dioxide of at least 1 to 1.5 polyamine to carbon dioxide is usually employed in the reaction; however, an excess of at least 1:2 polyamine to carbon dioxide is preferred. For example, hexamethylenediamine is dissolved in a suitable solvent such as para-xylene, in an amount not less than 10:1 volumes of solvent to weight of hexamethylenediamine. Of the above mentioned solvents, p-xylene is preferred, however, the reaction conditions employed when using this solvent are limited to a reaction temperature not exceeding 100° C., preferably between about 40° C. and about 80° C. and drying temperatures not greater than 70° C., preferably about 40° C. At temperatures above 80° C. the reaction is reversible and the formation of salt is accompanied with the formation of a considerable amount of free amine and carbon dioxide. When employing commercial hexamethylenediamine, containing between about 10 and about 35 percent water, the diamine is dehydrolyzed by azeotropic distillation; however, when pure hexamethylenediamine is employed, azeotropic removal of water is obviated. After the hexamethylenediamine is in an anhydrous state, in solution, carbon dioxide is introduced into the diamine solution at a desirable reaction temperature and with constant stirring. The mixture is stirred to prevent the formation of occluded lumps of hexamethylenediamine which cause scorcing when milled with the vulcanizable polymer. The carbamic acid inner salt begins to precipitate out of solution upon addition of the carbon dioxide and continues to form until the reaction is complete, in a period of from about 0.5 to about 20 hours, preferably from about 1 to about 10 hours at atmospheric pressure. The salt which precipitates out of solution is collected and dried at a temperature usually not in excess of 50° C. The salt product is a free flowing powder or granular material which is soluble in water but insoluble in non-polar solvents.

The above reaction can be carried out in an open or closed reactor in the presence or absence of pressure. The reaction period decreases with increase of pressure but the yield in both cases is almost quantitative. If desired, pressures up to about 25 atmospheres or higher may be imposed on the reaction.

Other alkylene carbamic acid salts such as tetraethylenetetramino-carbamic acid salt, pentamethyleneamino-carbamic acid salt, heptamethyleneamino-carbamic acid salt, N-phenylhexamethyleneamino-carbamic acid salt, decamethyleneamino-carbamic acid salt, N-carboxypentamethylenediamine are similarly prepared by employing the corresponding polyamine and reacting it with carbon dioxide under anhydrous conditions.

Examples of cross-linking agents which are suitably employed in the process of this invention are the carbamic radical containing salts of acyclic primary and secondary polyamines such as, for example the carbamic radical containing salts of tetraethylenepentamine, hexamethylenediamine, triethylenetetramine, diethylenetriamine, pentamethylenediamine, decamethylenediamine, undecamethylenediamine, N-trichloromethylpentamethylenediamine, N-phenylhexamethylenediamine, B-phenylbutylenediamine, heptamethylenediamine and homologs and isomers thereof. The preferred polyamine salt derivatives containing a carbamic radical are those which decompose under the conditions set forth in this invention to produce primary acyclic diamines. The polyamines so produced form amino linkages with the polymeric chains of the vulcanizable polymer.

The vulcanizable polymers which are used with the above described polyfunctional amine salts to produce the uniformly cross-linked polymers of this invention are linear chain saturated polymers which contain reactive substituents selected from the group consisting of fluorine, chlorine, bromine and iodine atoms, ether and ester radicals. The preferred polymers are linear chain saturated polymers having at least half of their hydrogen atoms substituted with halogen atoms. When the polymer is perhalogenated it is preferable that the entire polymer chain does not contain —$CF_2$— units. Homopolymers of tetrafluoroethylene, perfluoropropylene and other perfluorinated olefins and copolymers with other perfluorinated comonomers require evry high temperatures to bring about cross-linking. At such temperatures it becomes difficult to control the distribution of the cross-linking agent in the polymer so that a nonuniformly cross-linked polymer is likely to be produced.

In general, it may be said that the preferred halogenated chain polymers which can be linked by the method of the present invention are those which retain the recurring unit —CYZ—, wherein C is carbon and Y and Z are selected from the group consisting of halogens and hydrogen. The chain polymers being at least half halogenated but not completely fluorinated.

Among the preferred chain saturated polymers which may be cross-linked in accordance with this invention are the homopolymers of chlorotrifluoroethylene, vinylidene fluoride, and copolymers of 2-chloroperfluoropropylene, chlorotrifluoroethylene, dichlorodifluoroethylene, trifluoroethylene, chlorofluoroethylene, vinylidene fluoride and vinylidene chloride. These olefins may be copolymerized with each other in groups of two or more and in any proportions. They may also be copolymerized with other olefinic compounds such as ethylene, tetrafluoroethylene and perfluoropropene.

Other polymers which can be vulcanized in accordance with this invention include the chlorosulfonated polyethylenes, known commercially as Hypalon; Neoprene; polyvinyl chloride; the chlorinated styrenes such as, for example, α-chlorostyrene; the halogenated and nonhalogenated acrylates, such as ethylacrylate-β-chloroethyl vinyl ether copolymers, poly-1,1-dihydroheptafluorobutylacrylate, polyfluorobutylacrylate, polymethylacrylate, polyethylacrylate, polybutylacrylate, poly-α-chloromethylacrylate; epoxy resins and adhesives; epoxy-phenolic copolymers; brominated butyl rubbers such as brominated polyisobutylene and any combination of the monomers of these polymers with each other or with any of the halogenated monomers or polymers mentioned above.

In particular, this method of this invention is adapted to the cross-linking of chain polymers produced by the polymerization of perfluorochloroethylenes.

One of the most useful of the perfluorochloroethylene polymers is the polymer of chlorotrifluoroethylene. This particular polymer has now been developed to a stage in which it is commercially available and has many useful applications by reason of its chemical inertness and high physical strength and resilience, when in the form of a plastic. Four-fifths of the weight of polychlorotrifluoroethylene is made up of fluorine and chlorine. The plastic form of polychlorotrifluoroethylene is colorless and transparent and has a high chemical stability with no effect being observed on the polymer after prolonged exposure to hydrofluoric acid, hydrochloric acid and strong caustic solutions, as well as concentrated sulfuric acid, fuming nitric acid, aqua regia and other vigorous oxidizing materials. The plastic form of this polymer exhibits flexibility and resilience and is not affected by water, or by humidity and, in general, is an efficient electrical insulating material.

The elastomeric type chlorotrifluoroethylene polymers may be converted by the method of this invention to insoluble and infusible space polymers, which retain, for the most part, the desirable chemical inertness and physical strength of the plastic.

Perfluorochloroethylenes, and particularly chlorotrifluoroethylene, may be copolymerized with fluoroethylenes to produce rubber-like polymers displaying elastomeric properties, high tensile strength and flexibility at relatively low temperatures. These copolymers, and particularly the copolymers of chlorotrifluoroethylene and vinylidene fluoride, possess the abovementioned physical properties and also show a high degree of chemical inertness. They are also relatively easily soluble in various solvents and vehicles prior to cross-linking. These copolymers are produced in a mass polymerization system to form elastomer or in a water suspension or emulsion polymerization system to form latex. The latex can be converted to elastomer by coagulation, if desired.

The preferred proportions of the monomers chlorotrifluoroethylene and vinylidene fluoride for rubbery characteristics range from 20 to 70 mol percent of chlorotrifluoroethylene. Although chlorotrifluoroethylene-vinylidene fluoride resins containing from about 75 to about 95 percent by weight of chlorotrifluoroethylene may also be employed without departing from the scope of this invention.

By the method of this invention these rubbery copolymers may be transformed into soft vulcanizates of increased strength and toughness, of decreased solubility and of adequate and in some cases even increased extensibility.

In general, the acyclic polyamine salts containing a carbamic radical which are employed for the purpose of cross-linking in accordance with the present invention produce amino compounds which are designated by the formula $$YHN-R-NH_2 \qquad (2)$$

wherein R is the same as the alkylene radical of the corresponding polyamine salt from which the amine is derived; Y is selected from the group consisting of a hydrogen atom and an alkyl or an aryl radical and corresponds to the salt from which it is derived and the terminal amino groups in the above formula are preferably primary amino groups.

The product of the cross-linking reaction of this invention is a uniform polymer comprising a plurality of linear chains which contain functional groups such as active halogen atoms, ether linkages or ester linkages, which chains are cross-linked by linking carbon atoms located at the site of the functional groups with the polyfunctional amine radical, $-YN-R-NH-$, wherein Y, N and R are as defined above in Formula 2. Illustrative of the various types of cross-linked polymers which are prepared in accordance with this invention are the following which are illustrated by way of formulae:

Acrylate cross-linkage

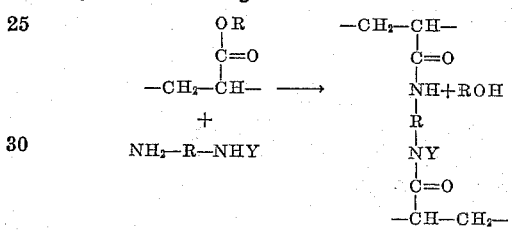

Haloolefin (chlorotrifluoroethylene) cross-linkage

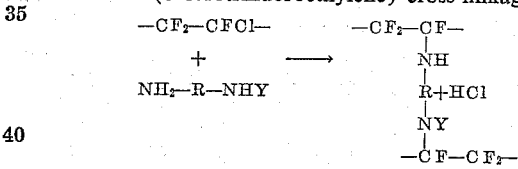

Epoxy cross-linkage

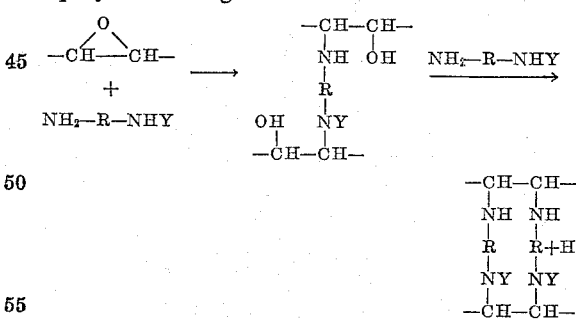

The preferred product of this invention is a uniform polymeric mass comprising a plurality of saturated at least half halogenated carbon chains, but not perfluorinated carbon chains, which chains are preferably cross-linked by a polyfunctional polyamine radical of the formula $-HN-R-NH-$ wherein R is most preferably a hydrocarbon diradical containing from 5 to 20 carbon atoms.

Generally, the amount of polyamine salt containing a carbamic radical employed as the cross-linking agent in this invention can be varied between about 0.1 and about 10 parts by weight per hundred parts by weight of polymer. However, a smaller amount of the polyamine salt may be used when it is desirable to provide a lesser degree of cross-linking. It is also permissible to employ a larger amount of cross-linking agent if the product desired is a highly vulcanized polymer where cross-linking takes place at almost all of the possible sites of addition. Some of the polymers, i.e. the epoxy resins, present more cross-linking opportunities than those having more spaced sites of addition. Other factors determining the amount of cross-linking agent to be used when the vulcanizable polymer is a copolymer are the nature of the comonomer, whether or not it can be vulcanized by this process, how much comonomer is present in the copolymer, and the physical state of the copolymer employed. Some comonomers such as the phenolic comonomer, in an epoxy-phenolic copolymer, cannot be cross-linked by the process of this invention and therefore the amount of vulcanizing agent used is governed by the amount of phenolic comonomer present in the polymer.

As stated above, the copolymerization product of chlorotrifluoroethylene and vinylidene fluoride may be prepared in a water suspension or an emulsion type system. In such systems the product is removed from the reactor as a latex. A dry rubbery copolymer is recovered by coagulation of the latex with salts and acids followed by washing and drying. For certain purposes such as dip coating, spraying, and spreading, the latex can be used directly. In these cases, the other ingredients (filler, cross-linking agent, etc.) are blended with the latex and the latex is then applied as a coating to a surface the copolymer is cross-linked and the latex is dried and heated.

When employing the preferred vulcanizable polymers of this invention as elastomers the amount of cross-linking or vulcanizing agent preferably employed is between about 1 and about 5 parts by weight per 100 parts by weight of polymer. When employing the preferred vulcanizable polymers as latices the amount of vulcanizing agent preferably employed is between about 0.1 and about 3 parts by weight per 100 parts by weight of polymer.

As explained above, when a halogenated polymer is cross-linked a hydrogen atom of the amino group combines with a halogen atom bonded to a carbon atom of the polymer chain, hydrogen halide is condensed out and the nitrogen of the amino group becomes bonded to the carbon atom from which the halogen has been removed.

Since hydrogen halide is evolved in the reaction, the linking proceeds most favorably when hydrogen halide is removed. Although removal of hydrogen halide is not essential for the preparation of suitably cross-linked polymer it is desirable to neutralize and remove the hydrogen halide by the addition of a basic compound and preferably an inorganic acid acceptor such as a metal oxide of lead, zinc or magnesium or Dyphos (lead oxide-lead phosphite) or any combination thereof. In some cases, particularly when cross-linking thin polymer sections, the hydrogen halide may be volatilized off at the temperatures used in the cross-linking reaction. When an inorganic acid acceptor is employed it is usually added to the vulcanization mixture in an amount between about 1 and about 25 parts by weight per 100 parts by weight of polymer.

Fillers are often added to the polymers discussed above to improve the molding characteristics, however, they are not necessary, nor do they contribute benefit to the cross-linking and curing processes of the present invention. They are therefore regarded as additives. When a filler is employed it is added to the vulcanization recipe in an amount between about 0.5 and about 15 parts by weight, preferably between about 1 and about 10 parts by weight per 100 parts by weight of polymer. Examples of fillers which may be used to improve molding characteristics of the polymers involved in the cross-linking process of this invention are Syton-200 silica, a precipitated silica such as Hysil-303, a silicon tetrachloride which has been treated in an oxidizing flame such as Cabotsil and a clay silicate such as magnesium aluminum silicate (Iceberg Pigment).

Another additive which does not affect the cure but which may increase modulus, tensile strength and hardness of the polymer is a high abrasion furnace carbon or carbon black such as, for example, Statex-R carbon black, Philblack O, channel black, and thermal black. Although from about 5 to about 100 parts by weight of carbon black may be employed per 100 parts of polymer, it is generally preferred to use from about 1 to about 50 parts of black, and most preferably from 15 to 25 parts.

In accordance with this invention, the desired amount of the carbamic radical containing derivative of the acyclic polyamine is added to the unvulcanized polymer and is intimately mixed therewith or compounded by employing any of the usual rubber mixing devices such as, for example a Banbury mixer, a roll mill, or any other convenient mixing device. It has been found that a two-roll rubber mill equipped with heat exchange means, for example, chambers cored for the purpose of cooling, is particularly suitable since the heat generated by the high shearing forces in mixing can be dissipated when using this type of mill.

For best results the temperature of the mixture on the mill is not allowed to rise above 205° F. and is not allowed to fall below 30° F. During milling it is necessary to distribute the acyclic polyamine salt uniformly throughout the polymer and to decompose the polyamine salt to the corresponding free polyamine so as to provide the active cross-linking agents by which the polymer chains are subsequently cross-linked. The acyclic polyamine salt, hexamethyleneamino carbamic acid inner salt begins to decompose at about 192±3° F. and at 275° F. is about 90 percent converted to free diamine and the polymer is cross-linked. It is desirable to prevent extensive cross-linking in the compounding step since the majority of polymers cannot be cast in a mold after a substantial amount of cross-linking has taken place. For this reason compounding is preferably effected at temperatures below 205° F. and when using the hexamethyleneamino carbamic acid inner salt it is preferred to compound the mixture at a temperature between about 130° F. and about 195° F. Some of the other polyamine salts such as, for example, N-carboxy-pentamethylene diamine, begin to decompose at lower temperatures for example at a temperature of about 50° F. and therefore in these cases compounding procedure is carried out at lower temperatures preferably between about 40° F. and about 55° F.

The mixture is milled until substantially all of the carbon dioxide is driven off. This operation usually requires a period of from 15 minutes to several days or more to complete depending upon the amount of material to be milled. When the decomposition temperature of the polyamine salt is reached the free polyamine linking agent is formed and the polymer in the subsequent curing process is uniformly cross-linked in the manner shown in the preceding formulae.

The compounded mixture so prepared can be cured immediately or can be stored for a period of two days or more and then cured. The curing process comprises pressing the compounded mixture to obtain a mold and then baking the pressing in an oven. Pressing of the compounded mixture is carried out at a temperature between about 200° F. and about 450° F., preferably between about 300° F. and about 350° F. for a period of from about 10 minutes to about 15 hours, preferably from about 0.5 hour to about 2 hours. A pressure of between about 100 and about 2,000, preferably between about 500 and about 1,000 pounds per square inch gauge is imposed on the compounded mixture in the mold. The molds may be coated with a silicon emulsion or a silicon oil (e.g. DC–200) and prebaked for about 4 hours at about 500° F. Chlorotrifluoroethylenevinylidene fluoride elastomer has been found to have better release properties when molded under these conditions; however, this coating step may be omitted if desired.

The resulting molded vulcanizate is then baked in an oven at a temperature between about 200° F. and about 400° F., preferably at about 350° F. for a period of from 2 hours or less to 25 hours depending upon the cross-sectional thickness of the sample. For example, a sample of 10 mils thickness requires a bake of about 2 hours whereas a sample of 80 to 100 mils thickness requires a bake of about 16 hours.

The molds are usually baked at atmospheric pressure, however pressures up to about 15 or 20 atmospheres can be applied if so desired.

As previously stated cross-linking with free polyamines of the type mentioned herein have been proposed. However, these polyamines when employed initially as cross-linking agents have been found to lack processability, that is, they are so highly reactive that they may scorch on the mill while being compounded with the polymer. The cross-linked polymeric product of this invention has been tested for storage scorching and after two days at room temperature no scorching was observed in the vulcanizate. In addition to this improvement, the acyclic polyamine salts of this invention can withstand the higher milling temperatures imposed by the shearing forces in the compounding process.

The salt of an acyclic polyamine used as a cross-linking agent in this invention is a salt containing a carbamic radical since these salts decompose at a desirable rate and at a desirable milling temperature to yield free polyamines.

The preferred alkyleneaminocarbamic acid salts of this invention which contain from 7 to 16 carbon atoms are powdery materials and therefore are more easily compounded with the polymer than liquids such as a carbonate salt which is hydroscopic.

The cross-linked polymer products of this invention have increased elasticity, toughness, chemical resistance and heat stability and, in general, show improvement over similarly cross-linked polymers heretofore prepared.

a 22 liter metal heating mantle and the mixture kept at reflux temperature until all of the water was removed by azeotropic distillation. The solution was then allowed to cool. The Dean-Stark trap was replaced by a reflux condenser and carbon dioxide was introduced through the inlet tube over a period of six hours during which time the temperature was maintained between 60° C. and 75° C. Precipitation of the carbamic acid inner salt began as soon as carbon dioxide was introduced into the system. At the end of the reaction the white finely dispersed solid was removed by filtration of the hot slurry. The filter cake was sucked dry. After the cake was powdered it was spread in a thin layer for air drying over a period of 24 hours. The yield of hexamethyleneaminocarbamic acid inner salt (1280 grams) was almost quantitative.

The carbamic acid inner salt of hexamethylenediamine prepared according to the conditions set forth above began to decompose above 80° C. and at 135° C. is 92 percent converted to the free diamine. The analytical results obtained on percent nitrogen and percent carbon dioxide for the carbamic acid inner salt are reported below:

|  | Percent N | Percent $CO_2$ |
|---|---|---|
| Theoretical for— | | |
| Hexamethylene-diamine carbonate | 15.7 | 24.7 |
| Hexamethylene-aminocarbamic acid inner salt | 17.5 | 27.5 |
| Found | 17.9 | 27.5 |

Infrared analysis also supported the carbamic acid inner salt structure.

The following table (Table I) illustrates additional examples for preparing the hexamethyleneaminocarbamic acid inner salt. The procedure followed in each case is similar to that reported in Example 1.

TABLE I

Reaction of Hexamethylenediamine With Excess Carbon Dioxide

| Composition of reaction medium | | | Reaction conditions | | | Treatment of salt | Evaluation of salt as a curative for chlorotrifluoroethylene-vinylidene fluoride elastomer | |
|---|---|---|---|---|---|---|---|---|
| Methanol, cc. | Water, gm. | Hexamethylenediamine, gm. | Temp., °C. | Time, hrs. | Agitation | | Appearance of sheet | Tensile strength, p.s.i.g. |
| 500 | 15 | 35 | −80 | 24 | Moderate | Filtered and dried | Completely spotted with scorch spots | 1,380 |
| 500 | 15 | 35 | (¹) | 24 | Mild | do | Scorch spots | 1,925 |
| 240 | 21 | 49 | 35 | 2 | Moderate | do | Completely spotted | 1,750 |
| 375 | 33 | 77 | (¹) | 6 | Vigorous | Filtered and dried—leached with hot benzene—filtered and dried—added some hexamethylenediamine to dried sample. | do | 1,465 |
| Benzene cc. | | | | | | | | |
| 500 | 5 | 35 | 75 | 1 | Moderate | Filtered and dried | do | 1,410 |
| 510 | 0 | 35 | (¹) | 1 | do | do | No scorch spots | 2,625 |
| 510 | 0 | 35 | 75 | 1 | do | do | do | 2,235 |
| 5,260 | 0 | 383 | 75 | 1.5 | do | do | do | 2,700 |

¹ Heat of reaction.

The following examples are offered as a better understanding of the present invention and are not to be construed as unnecessarily limiting thereto.

EXAMPLE 1

*Preparation of Hexamethyleneaminocarbamic Acid Inner Salt*

In a 22 liter three necked round bottomed flask fitted with an inlet tube, a Hirshberg stirrer and a Dean-Stark trap, was placed 1400 cc. (1290 grams) of about a 70 percent solution of hexamethylenediamine in water, and 12 liters of benzene. The flask was heated by means of The reaction between anhydrous hexamethylenediamine and carbon dioxide was carried out using p-xylene as the solvent, in an amount of 10:1 volumes of solvent to weight of amine. The reaction was carried out at about 70° C. with agitation. The cured pressed sheet of the polymer was a tough, resilient material and showed no signs of scorch.

Any of the other acyclic polyamines mentioned heretofore can be reacted with carbon dioxide in the manner set forth in Example 1 to produce the corresponding acyclic polyamine carbamic acid salt of this invention.

The following recipes given in Table II were individually milled on a 2-roll rubber mill equipped with cored chambers for the purpose of dissipating the heat generated in milling. The values are given in parts by weight.

TABLE II

| Recipe | 1 | 2 | 3 | 4 | 5 | 6 |
|---|---|---|---|---|---|---|
| Elastomer: | | | | | | |
| Chlorotrifluoroethylene-65-70 mole percent vinylidene fluoride | 100 | 100 | 100 | 100 | 100 | 100 |
| Chlorotrifluoroethylene-47-54 mole percent vinylidene fluoride | | | | | 100 | |
| Zinc oxide | 10 | 10 | 10 | 10 | 10 | 10 |
| Dyphos (2PbO·PbHPO$_3$) | 10 | 10 | 10 | 10 | 10 | 10 |
| Cross-linking agent hexamethyleneamino-carbamic acid inner salt | 3 | 3 | 3 | 3 | 3 | 3 |
| Aids: | | | | | | |
| Syton-200 silica | | | | 5 | 5 | |
| High abrasion furnace black | | 20 | | 5 | 20 | |
| "Kel-F" 40 oil (polychlorotrifluoroethylene of average molecular weight-940 | | | | | | 15 |

All mixtures except #2 were compounded on the mill at 200° F. stock temperature. Mixture #2 was compounded at a temperature between 170° F. and 190° F. stock temperature.

The above mixtures in Table II were compounded on the mill until thoroughly and uniformly mixed while allowing the volatiles ($CO_2$) to escape. Each stock (or product) was examined after milling and none showed signs of scorch. Stocks 1 and 3 were stored at 77° F. for one week and molded into 6 x 6 inch test slabs. No sign of scorch was evident. Without polyamine present as a salt, similar compounds show scorch during compounding at 200° F. and also during aging at room temperature (about 77° F.).

The milled stocks were then cured. Each stock was pressed at 350° F. for a period of 0.5 hour, and all except stock #1 was then baked in a hot air oven at 300° F. for a period of 16 hours. The physical properties of the individually cured cross-linked polymers corresponding to the stock products obtained above in the milling process are given below in Table III.

TABLE III

| Cured cross-linked polymers | 1 | 2 | 3 | 4 | 5 | 6 |
|---|---|---|---|---|---|---|
| Tensile strength, p.s.i.g | 2,100 | 1,650 | 2,000 | 1,650 | 1,800 | 1,550 |
| Stress at 100% elongation p.s.i.g | 1,000 | 1,200 | 800 | 1,200 | | |
| Percent elongation | 325 | 150 | 275 | 150 | 350 | 450 |
| Shore A hardness | 56 | 75 | 60 | 76 | 53 | 50 |
| Tear strength, pounds per inch | 150 | 160 | 160 | 165 | | |
| Compression set, percent: | | | | | | |
| 70 hours at 212° F | 37 | 45 | 37 | 45 | | |
| 70 hours at 300° F | 45 | 55 | 44 | 54 | | |

A hexamethylenediamine diacetate oven cured cross-linked chlorotrifluoroethylene-vinylidene fluoride polymer showed a tensile strength in pounds per square inch gauge of only 1410.

Stock #1 has been oven aged for 30 days at 400° F. to test its thermal stability. No physical change in the compound has been detected (see Table IV). Stock #6 has been extruded into ¼ inch tubing.

All compounded compositions given above in Table III showed excellent resistance to a variety of mineral acids, oils and fuels at elevated temperatures (Table V). Their high temperature oil resistance, 300° F. to 400° F., and their greater toughness makes them particularly suitable for gaskets, hose, O-rings, seals and fuel cells in contact with sour crude petroleum products, petroleum based hydraulic oils, polyethylene glycol synthetic lubricants, silicon oils, reference oil ASTM #3 oil, transmission oils and extreme pressure lubricants, pyranol transformer oils, ortho silicate aircraft engine oils; cyclohexane, iso-octane and other aliphatics; UP-4 and UP-5 aircraft fuels, and 70/30 isooctane/toluene aromatic fuel.

TABLE IV

*Thermal Stability*

Compound 3

| Thermal stability, days/°F | 14/380 | 30/380 | 14/450 | 30/450 |
|---|---|---|---|---|
| Tensile strength, p.s.i.g | 1,960 | 2,080 | 1,150 | 1,190 |
| Percent elongation | 350 | 400 | 150 | 50 |
| Hardness, Shore A | 62 | 62 | 77 | 80 |

Compound 4

| Thermal stability, days/° F | 14/380 | 30/380 | 14/450 | 30/450 |
|---|---|---|---|---|
| Tensile strength, p.s.i.g | 2,250 | 2,200 | 1,420 | 1,460 |
| Percent elongation | 175 | 150 | 75 | 50 |
| Hardness, Shore A | 82 | 82 | 87 | 90 |

TABLE V

*Chemical Resistance*

| Compounded composition | 3 | | 4 | |
|---|---|---|---|---|
| Immersion time, days | 14 | 30 | 14 | 30 |
| Red fuming nitric acid at 77° F.: | | | | |
| Tensile strength, p.s.i.g | 750 | 580 | 515 | 520 |
| Percent elongation | 740 | 480 | 700 | 700 |
| Volume swell, percent | 34 | 32 | 21 | 21 |
| 98% $H_2SO_4$ at 220° F.: | | | | |
| Tensile strength, p.s.i.g | 1,475 | 1,430 | 1,540 | 1,140 |
| Percent elongation | 300 | 300 | 400 | 400 |
| Volume swell, percent | 25 | 27 | 33 | 30 |
| 70/30 iso-octane/toluene at 77° F.: | | | | |
| Tensile strength, p.s.i.g | 1,530 | 1,355 | 1,850 | 1,290 |
| Percent elongation | 250 | 175 | 250 | 200 |
| Volume swell, percent | 14 | 15 | 11 | 14 |
| Texamatic A oil at 300° F. (transmission oil): | | | | |
| Tensile strength, p.s.i.g | 1,950 | 1,860 | 2,330 | 2,210 |
| Percent elongation | 350 | 325 | 250 | 250 |
| Volume swell, percent | 5 | 4 | 4 | 5 |
| OS-45 oil at 300° F. (ortho silicate oil): | | | | |
| Tensile strength, p.s.i.g | 1,900 | 1,715 | 2,080 | 1,800 |
| Percent elongation | 400 | 450 | 300 | 300 |
| Volume swell, percent | 4 | 4 | 4 | 4 |
| MIL-O 5606 oil at 300° F. (petroleum base hydraulic oil): | | | | |
| Tensile strength, p.s.i.g | 1,820 | 1,660 | 2,000 | 1,725 |
| Percent elongation | 450 | 400 | 250 | 200 |
| Volume swell, percent | 7 | 13 | 8 | 13 |
| ASTM oil No. 3 at 300° F.: | | | | |
| Tensile strength, p.s.i.g | 1,900 | 1,835 | 2,200 | 1,930 |
| Percent elongation | 350 | 400 | 250 | 200 |
| Volume swell, percent | 8 | 7 | 5 | 7 |
| Steam at 300° F., immersion time, days | 1 | 7 | 1 | 7 |
| Tensile strength, p.s.i.g | 1,320 | 1,000 | 1,430 | 1,125 |
| Percent elongation | 450 | 700 | 300 | 350 |
| Volume swell, percent | 20 | 20 | 16 | 16 |
| Water absorption at 77° F. 30 day test, percent | 4 | | 2.4 | |

If desired, the salt cross-linking agents of this invention may be used in combination with other cross-linking agents, including free polyamines. In those cases when the salt cross-linking agents of this invention are used in conjunction with free polyamines, smaller amounts of free amines may be used than would otherwise be required. Thus, the effect of scorching may be minimized, if not completely eliminated. In any case, even if scorching is not completely eliminated, the resulting polymer is one which gains in strength during aging.

Films of cross-linked halogenated polymers, formed in situ, may be used for the protection of metallic surfaces against corrosive conditions. Such films have substantially the same chemical inertness as the films of chain polymer, but greater toughness and better heat resistance.

Self-supporting films of cross-linked polymer can also be advantageously made. In the case of rubbery copolymers, cross-linking produces vulcanizates of increased strength but unreduced or even superior extensibility.

Polymer containing more than half of its hydrogen atoms substituted with halogen atoms can also be used as wire coatings since the advantageous electrical properties of the halogenated polymers are only slightly reduced in cross-linking by the production of product materials.

The cross-linked polymers of this invention may also be used as impregnates and/or as coatings for yarns and fabrics, including the yarns and fabrics of asbestos, glass, synthetic resins, and natural fibers.

It is to be understood without departing from the scope of this invention that any of the other previously described polymers can be cross-linked with any of the previously described carbamic radical containing salt derivatives of acyclic polyamines in a manner similar to that set forth in the examples to give the corresponding cross-linked polymer having increased elasticity, toughness, insolubility and other improved properties.

The present invention relates to the novel cross-linking agents namely the carbamic radical containing salt derivatives of acyclic polyamines, i.e. polyamines wherein the terminal nitrogen atoms are bonded to a chain of acyclic carbon atoms and to the method for employing them in a cross-linking reaction with a vulcanizable chain saturated polymer containing active substituents selected from the group consisting of fluorine, chlorine, bromine and iodine atoms and ether and ester radicals. The method for effecting the reaction may be any of the various modifications and alternatives of the procedure set forth herein and may become apparent to those skilled in the art without departing from the scope of this invention.

Having thus described my invention I claim:

1. A process for cross-linking a linear chain saturated polymer of an ethylenically unsaturated monomer, said monomer having substituents selected from the group consisting of fluorine, chlorine and, bromine and which comprises mixing said polymer with 0.1 and 10 parts by weight per 100 parts by weight of polymer of a carbamic acid salt of an acyclic polyfunctional amine, said amine containing amino groups as the sole reactive groups, decomposing said salt by heating to liberate the free amine and carbon dioxide at a temperature between 30° F. and 205° F. and reacting the amine with said polymer at a temperature below 450° F.

2. A vulcanizing admixture comprising a linear chain saturated polymer of an ethylenically unsaturated monomer, said monomer having substituents selected from the group consisting of fluorine, chlorine and, bromine and 0.1 and 10 parts by weight per 100 parts by weight of polymer of a carbamic acid salt of an acyclic polyfunctional amine containing amino groups as the sole reactive groups.

3. A vulcanizing admixture comprising a linear chain saturated polymer of an ethlenically unsaturated monomer, said monomer having substituents selected from the group consisting of fluorine, chlorine and, bromine and 0.1 and 10 parts by weight per 100 parts by weight of polymer of a carbamic acid salt of an acyclic polyfunctional amine containing amino groups as the sole reactive groups and from 5 to 20 carbon atoms.

4. A vulcanizing admixture comprising a linear chain saturated polymer of an ethylenically unsaturated monomer, said monomer having substituents selected from the group consisting of fluorine, chlorine and, bromine and 0.1 and 10 parts by weight per 100 parts by weight of a polymer of a carbamic acid salt of an unsubstituted acyclic diamine containing amino groups as the sole reactive groups and at least 6 carbon atoms.

5. The method of claim 1 wherein the carbamic radical containing salt is N-carboxypentamethylenediamine.

6. The method of claim 1 wherein the carbamic acid salt is the hexamethyleneaminocarbamic acid inner salt.

7. The method of claim 1 wherein the carbamic acid salt is the decamethyleneaminocarbamic acid inner salt.

8. The method of claim 1 wherein the carbamic acid salt is the heptamethyleneaminocarbamic acid inner salt.

9. The method of claim 1 wherein the carbamic acid salt is N-phenylhexamethyleneaminocarbamic acid inner salt.

10. The method of claim 1 wherein the linear vulcanizable polymer is an ethylacrylate-B-chloroethyl vinyl ether copolymer.

11. The method of claim 1 wherein the linear vulcanizable polymer is polychlorotrifluoroethylene.

12. The method of claim 1 wherein the linear vulcanizable polymer is a copolymer of chlorotrifluoroethylene and vinylidene fluoride.

13. The process for cross-linking an elastomeric copolymer of chlorotrifluoroethylene and vinylidene fluoride which comprises compounding said copolymer in the presence of a mixture of zinc oxide and lead oxide with 0.1 and 10 parts by weight per 100 parts by weight of polymer of hexamethyleneaminocarbamic acid inner salt, at a temperature between about 130° and about 195° F. decomposing said salt by heating to liberate the free amine and carbon dioxide, said amine containing amino groups as the sole reactive groups and curing the compounded admixture at a temperature between about 200° F. and about 450° F. to produce a cross-linked elastomer of increased strength and extensibility.

14. A vulcanizing admixture comprising an elastomeric copolymer of chlorotrifluoroethylene and vinylidene fluoride and hexamethyleneaminocarbamic acid inner salt.

References Cited in the file of this patent

UNITED STATES PATENTS

| | | |
|---|---|---|
| 2,405,008 | Berry et al. | July 30, 1946 |
| 2,444,333 | Castan | June 29, 1948 |
| 2,623,867 | Dreyfus | Dec. 30, 1952 |
| 2,629,709 | Uraneck et al. | Feb. 24, 1953 |
| 2,635,124 | Hunter et al. | Apr. 14, 1953 |
| 2,653,924 | Olin | Sept. 29, 1953 |
| 2,661,370 | Barber | Dec. 1, 1953 |
| 2,739,981 | Szabo et al. | Mar. 27, 1956 |
| 2,753,323 | Farnham | July 3, 1956 |
| 2,793,200 | West | May 21, 1957 |

FOREIGN PATENTS

| | | |
|---|---|---|
| 838,217 | Germany | May 5, 1952 |

OTHER REFERENCES

J.A.C.S., vol. 73, pp. 1829–1831 (1951).